May 13, 1958  H. A. BERTRAND  2,834,606
SAFETY DEVICE FOR PASSENGERS
Filed Oct. 5, 1955  2 Sheets-Sheet 1
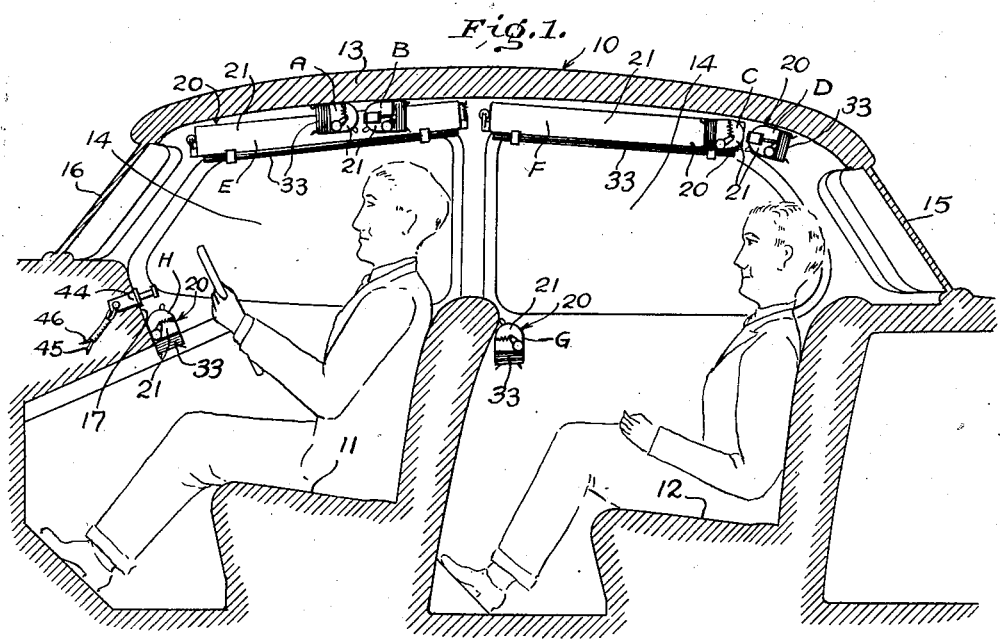
INVENTOR.
Harry A. Bertrand

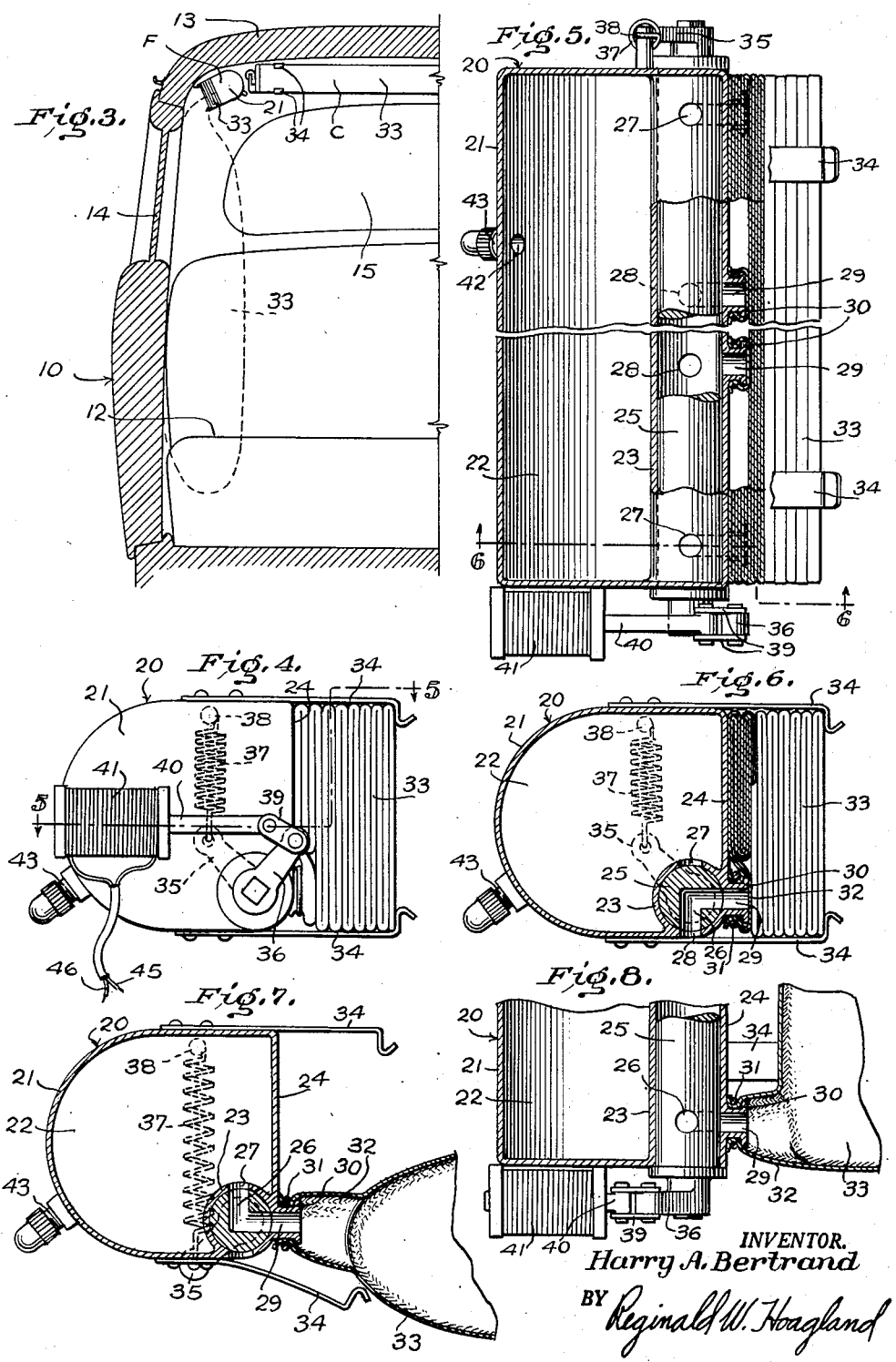

United States Patent Office 2,834,606
Patented May 13, 1958

2,834,606

SAFETY DEVICE FOR PASSENGERS

Harry A. Bertrand, Flint, Mich.

Application October 5, 1955, Serial No. 538,748

3 Claims. (Cl. 280—150)

The present invention relates to safety devices used in passenger conveyances for protecting passengers against being thrown in direct contact with non-yieldable parts of the conveyance should said conveyance become involved in an accident.

Another object of the invention is to provide, at a location within a conveyance, a safety device having a normally compact deflated bag which can be immediately inflated when it is observed that an unavoidable crash is imminent, and for providing with said bag a cushion-like barrier between a passenger and parts of the conveyance which could do bodily harm to the passenger should he be thrown thereagainst.

Another object of the invention is to provide, in a safety device as outlined above, an inflatable bag positioned relative to a seated passenger in a conveyance and structure of the conveyance whereby said bag will be relocated to a position between and in engagement with both the structure of the conveyance and the passenger upon its inflation and thereby support the passenger against movement from a seated position when a crash occurs.

Another object of the invention is to provide, in a device as set forth, a plurality of deflated bags which are at locations within a conveyance where they are least noticeable and are arranged relative to one another for immediate inflation and for substantially encasing the passengers of the conveyance, either singularly or in numbers, should a crash occur.

A further object of the invention is to provide, in a safety shock-absorbing device of the above character, a novel construction and arrangement of parts for effecting immediate inflation of a deflatable folded bag.

A still further object of the invention is the provision of a safety shock-absorbing device of the character set forth wherein a time delay element automatically deflates the shock-absorbing bag after a designated period of time has elapsed since its inflation.

It is also an object of the invention to provide a safety shock-absorbing device of the above-indicated character, which is simple and substantial in construction, economical to manufacture, and thoroughly efficient and practical in use.

These, together with various auxiliary features and objects of the invention which will later become apparent as the following description proceeds, are attained by the present invention, a preferred embodiment of which has been illustrated by way of example only in the accompanying drawings, wherein:

Figure 1 is a longitudinal, vertical, sectional view through an automobile body with passengers therein and showing a plurality of the improved safety devices in deflated positions and at various selected locations in said body;

Figure 2 is a similar sectional view showing the safety devices inflated and supporting passengers in their normal seated positions;

Figure 3 is a fragmentary cross sectional view of the automobile body, showing in full lines safety devices deflated, and in dotted lines, a position of a bag when inflated;

Figure 4 is an end view of one of the safety devices in deflated, folded position and ready for use;

Figure 5 is a longitudinal section and elevation taken substantially on line 5—5 of Figure 4, and with the central portion thereof broken away;

Figure 6 is a cross sectional view taken on line 6—6 of Figure 5;

Figure 7 is a view similar to Figure 6 but showing parts in inflating position;

Figure 8 is a fragmentary sectional view similar to one end portion of Figure 5, but showing parts in inflating position; and, Figure 9 is a wiring diagram showing electric controls for inflating and deflating the bags of the safety devices.

Referring now more specifically to the accompanying drawings wherein like numerals designate similar parts throughout the various views, the numeral 10 indicates a passenger-carrying compartment of a conveyance, which in the present instance, is the body of an automobile, having both a forward seat 11 and rear seat 12 therein. The automobile body is of the usual closed type with a permanent top 13, side and rear windows 14 and 15, respectively, and windshield 16 extending upwardly and in advance of an instrument panel 17.

The improved safety devices forming the subject matter of this invention and generally indicated by the numeral 20 may vary in number, and their locations relative to one another and relative to differently shaped and constructed compartments of conveyances may be altered from that shown in the drawings. For the purpose of illustration, four safety devices, A, B, C, and D, are shown as being mounted in pairs and parallel to one another on the underside of the top 13 of the automobile passenger compartment and as extending transversely thereof; two safety devices, E, and F, as also being mounted on the underside of the top 13 but end to end and extending longitudinally above each pair of side windows 14; one transversely extending safety device, G, as being mounted on the rear of the back of the forward seat 11; and one transversely extending safety device H as being mounted along the lower portion of the instrument panel 17.

Each safety device 20 is provided with an elongated casing 21 that has a compressed air chamber 22 therein and a cylindrical valve-receiving chamber 23 extending longitudinally therethrough and at a lower corner of a flat longitudinal side 24 of said casing. A movable valve element 25 in the form of a round rod is closely fitted and rotatably supported in the cylindrical chamber 23 and has a plurality of spaced L-shaped openings 26 therethrough that are adapted to align with either of two sets of oppositely arranged openings 27 and 28 in the wall of said cylindrical chamber leading to the compressed air chamber 22 and to the outside of the casing 21, respectively, upon a quarter turn of the rotary valve element. When either end of each L-shaped opening 26 is in alignment with either an opening 27 or 28, the other end of said L-shaped opening 26 is registered with one of another set of openings 29 through outwardly flanged nipples 30.

Slipped over the flanged nipples 30 and held in place by retainer rings 31 are the open ends of separate and spaced sleeve extensions 32 of a relatively large airtight bag 33. The bag is of substantially the same width as the length of the casing 21 to which it is attached, and when not in use, is folded and held against the flat side 24 of the casing by the free ends of oppositely disposed pairs of spring clips 34 secured to the casing, as best shown in Figures 4, 5, and 6. These clips are constructed to immediately release the bag upon the start of inflation of said bag.

On reduced extensions at the opposite ends of the rotary element 25 of the valve and outwardly of the ends of the casing 21 are fixed crank arms 35 and 36. A spring 37 has one end thereof connected to the crank arm 35 and has its other end connected to the casing, as at 38, for yieldably holding the valve 25 in a position registering its L-shaped openings 26 with the openings 28 leading to the atmosphere and openings 29 leading to the bag 33. The other crank arm 36 is connected by a pair of links 39 to the actuated element 40 of a solenoid 41 mounted on an end wall of the casing 21. Upon energizing the solenoid 41, the rotary element 25 of the valve is rotated one quarter of a turn against tension of the spring 37 and registers the L-shaped openings therein with the openings 27 and 29 communicating the interior of the bag 33 with the compressed air chamber 22. The purpose of having a number of openings 26 in the valve 25 that communicates the compressed air chamber 22 with the interior of the bag 33 and the interior of the bag with the atmosphere is to inflate and deflate the bag evenly and as rapidly as possible.

There is a small opening 42 in the wall of the casing 21 to the compressed air chamber 22, and a valve extension 43 of the type used on pneumatic tires is fixed at said opening through which air under pressure is supplied to the chamber.

Mounted on the instrument panel 17 within quick and convenient reach of the operator of the automobile is a time delay switch 44 which, when manually operated, immediately closes an electric circuit through wires 45 and 46 and a battery 47 to the solenoids 41 of all safety devices 20, and which, after a predetermined time has elapsed, breaks the electric circuit. In the wiring diagram shown in Figure 9, it will be noted that the circuit is bridged between a pair of spring fingers 48 by a movable contact 49 on a manually operated plunger 50 of the switch, and at the same time, a small spring 51 in an air-metering chamber 52 is compressed for time control of return movement of the movable contact 49 to break the circuit.

During normal operation of the conveyance, which in the present instance is shown as an automobile, all air bags 33 remain neatly folded and at locations where they do not interfere with the vision or comfort of the passengers, as best shown in Figure 1 of the drawings. When it is apparent that an unavoidable crash of the automobile is about to occur, the operator of the vehicle presses the plunger 50 of the switch 44 which immediately causes an inflation of all bags 33. The expanding of the bags, as shown in Figure 2, extends portions of said bags throughout the major portions of the spaces between the passengers and structural parts of the interior of the passenger compartment of the automobile, thus applying pressure on the passengers for supporting them in their normal seated positions when the crash occurs. After sufficient time has elapsed since the crash to render the air bags no longer useful, said bags are automatically deflated by the exhausting of air in the bags to the atmosphere.

While a number of bags are shown at positions for completely surrounding the passengers of a crashing automobile, it is to be understood that certain of the safety devices may be dispensed with and the devices used only as barriers between the passengers and structural parts against which passengers are more often thrown during automobile accidents.

In view of the above description, taken in conjunction with the accompanying drawings, it is believed that a clear understanding of the construction, operation, and advantages of the improved invention will be quite apparent to those skilled in this art. A more detailed description is accordingly deemed unnecessary.

It is to be understood, however, that even though there is herein shown and described a preferred embodiment of the invention, various changes may be made without departing from the spirit and full intendment of the invention.

What is claimed is:

1. A safety device for use in a passenger-carrying compartment of a conveyance, said safety device comprising a casing having therein a compressed fluid chamber, an inflatable bag connected to said casing, supporting means for yieldably holding said bag when deflated in a folded position adjacent said casing, a valve for communicating the chamber of said casing with the interior of said bag and for communicating the interior of the bag with the atmosphere, spring means for normally and yieldably holding said valve in a position communicating the interior of the bag with the atmosphere, an electric solenoid connected to said valve and when energized moves said valve to the position where the chamber of the casing and interior of the bag communicate, said bag being forced from its yieldable support and extended by the expansion thereof to a position between a passenger and structural parts of the conveyance upon the inflation thereof, and a time delay electric switch conveniently arranged in said compartment of the conveyance and wired to said solenoid for energizing the same to inflate the bag and for de-energizing said solenoid to deflate the bag after a period of time has elapsed since said inflation.

2. A safety device for use in a passenger-carrying compartment of a conveyance, said safety device comprising a casing having a chamber therein containing a fluid under pressure, an inflatable bag connected to said casing, supporting means for yieldably holding said bag when deflated in a folded position adjacent said casing, a valve for communicating the chamber with the interior of the bag and for communicating the interior of the bag with the atmosphere, spring means for normally and yieldably holding said valve in a position communicating the interior of the bag with the atmosphere, operating means connected to said valve so as to move and hold said valve to the position where the interiors of the chamber and bag communicate, said bag being forced from its yieldable supporting means and extended by the expansion thereof to a position between a passenger and structural parts of the conveyance upon the inflation thereof, and a time delay mechanism set by said operating means that allows said spring means to return said valve to its initial position for deflating the bag after a period of time has elapsed since said inflation.

3. A passenger-cushioning and -supporting apparatus in combination with a passenger-carrying compartment of a conveyance, said passenger-cushioning and -supporting apparatus comprising a plurality of deflated and collapsible bags supported within said compartment at different locations where they are inconspicuous and are out of the way, an inflating means for each of said bags that is constructed and arranged relative to its associated bag so as to immediately inflate the bag when it is apparent that a crash of the conveyance is imminent, said bags being of sizes and an arrangement relative to one another that when inflated are extended by the expansion thereof into contact with one another and into spaces between the passengers and interior surfaces of said compartment, deflating means for each of said bags, and a time delay element that operates all of said deflating means after a period of time has elapsed since the inflation of said bags.

References Cited in the file of this patent

UNITED STATES PATENTS

| 1,675,957 | Reeves | July 3, 1928 |
| 2,649,311 | Hetrick | Aug. 18, 1953 |
| 2,755,125 | Hodges | July 17, 1956 |

FOREIGN PATENTS

| 896,312 | Germany | Nov. 12, 1953 |